(12) United States Patent
Whitehead et al.

(10) Patent No.: US 8,277,056 B2
(45) Date of Patent: Oct. 2, 2012

(54) LOCALLY DIMMED DISPLAY

(75) Inventors: Lorne A. Whitehead, Vancouver (CA);
Gregory John Ward, Berkeley, CA
(US); Wolfgang Stuerzlinger, Toronto
(CA); Helge Seetzen, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 13/440,246

(22) Filed: Apr. 5, 2012

(65) Prior Publication Data

US 2012/0188296 A1    Jul. 26, 2012

Related U.S. Application Data

(60) Continuation of application No. 13/097,823, filed on Apr. 29, 2011, now Pat. No. 8,172,401, which is a continuation of application No. 12/855,918, filed on Aug. 13, 2010, now Pat. No. 7,942,531, which is a continuation of application No. 12/410,125, filed on Mar. 24, 2009, now Pat. No. 7,801,426, which is a continuation of application No. 11/831,749, filed on Jul. 31, 2007, now Pat. No. 7,581,837, which is a continuation of application No. 11/702,839, filed on Feb. 5, 2007, now Pat. No. 7,413,307, which is a continuation of application No. 11/351,962, filed on Feb. 10, 2006, now Pat. No. 7,172,297, which is a continuation of application No. 11/112,428, filed on Apr. 22, 2005, now Pat. No. 7,106,505, which is a division of application No. 10/469,473, filed as application No. PCT/CA02/00255 on Feb. 27, 2002, now Pat. No. 6,891,672.

(60) Provisional application No. 60/271,563, filed on Feb. 27, 2001.

(51) Int. Cl.
*G03B 21/14* (2006.01)
(52) U.S. Cl. ............... 353/121; 353/85; 353/30; 349/61
(58) Field of Classification Search ............... 353/30, 353/31, 79, 85, 94, 121; 348/771; 349/5, 349/7, 61; 315/307; 359/443–461
See application file for complete search history.

(56) References Cited

U.S. PATENT DOCUMENTS

| 4,170,771 | A | * | 10/1979 | Bly | 345/81 |
| 4,229,095 | A | * | 10/1980 | Mir | 358/300 |
| 4,316,196 | A | * | 2/1982 | Jacobs | 347/237 |
| 4,364,039 | A | * | 12/1982 | Penz | 345/4 |
| 4,374,397 | A | * | 2/1983 | Mir | 358/505 |

(Continued)

FOREIGN PATENT DOCUMENTS

EP    0730371 A2    9/1996

(Continued)

OTHER PUBLICATIONS

Funamoto et al., "High-Picture-Quality Technique for LCD Televisions: LCD-AI", Proc. Sid, International Display Workshop (IDW '00), Nov. 2000, p. 1157-1158.

(Continued)

*Primary Examiner* — William C Dowling

(57) ABSTRACT

A locally dimmed display has a spatial light modulator illuminated by a light source. The spatial light modulator is illuminated with a low resolution version of a desired image. The illumination may comprise a series of lighting elements that vary smoothly from one element to another at the spatial light modulator.

22 Claims, 6 Drawing Sheets

U.S. PATENT DOCUMENTS

| | | | | |
|---|---|---|---|---|
| 4,378,568 A * | 3/1983 | Mir | | 358/505 |
| 4,441,791 A * | 4/1984 | Hornbeck | | 359/295 |
| 4,559,480 A * | 12/1985 | Nobs | | 315/324 |
| 4,580,877 A * | 4/1986 | Washo | | 349/69 |
| 4,637,150 A * | 1/1987 | Geluk | | 40/361 |
| 4,726,663 A * | 2/1988 | Buzak | | 349/80 |
| 4,801,194 A * | 1/1989 | Agostinelli et al. | | 359/259 |
| 4,853,824 A * | 8/1989 | Tsuzurahara | | 361/302 |
| 4,868,668 A * | 9/1989 | Tavernetti | | 348/745 |
| 4,933,754 A * | 6/1990 | Reed et al. | | 358/506 |
| 4,954,789 A * | 9/1990 | Sampsell | | 359/318 |
| 4,987,410 A * | 1/1991 | Berman et al. | | 345/9 |
| 4,995,719 A * | 2/1991 | Shanks | | 353/122 |
| 5,029,967 A * | 7/1991 | Livezey et al. | | 385/37 |
| 5,075,789 A * | 12/1991 | Jones et al. | | 349/7 |
| 5,103,328 A * | 4/1992 | Numao | | 349/74 |
| 5,122,791 A * | 6/1992 | Gibbons et al. | | 345/102 |
| 5,144,292 A * | 9/1992 | Shiraishi et al. | | 345/102 |
| 5,247,366 A * | 9/1993 | Ginosar et al. | | 348/256 |
| 5,359,345 A * | 10/1994 | Hunter | | 345/102 |
| 5,386,253 A * | 1/1995 | Fielding | | 348/745 |
| 5,422,691 A * | 6/1995 | Ninomiya et al. | | 353/69 |
| 5,504,504 A * | 4/1996 | Markandey et al. | | 345/214 |
| 5,537,233 A * | 7/1996 | Miura et al. | | 349/61 |
| 5,537,256 A * | 7/1996 | Fergason | | 359/484.06 |
| 5,572,341 A * | 11/1996 | Fergason | | 349/200 |
| 5,592,193 A * | 1/1997 | Chen | | 345/102 |
| 5,639,158 A * | 6/1997 | Sato | | 362/247 |
| 5,646,702 A * | 7/1997 | Akinwande et al. | | 349/69 |
| 5,652,672 A * | 7/1997 | Huignard et al. | | 359/292 |
| 5,666,226 A * | 9/1997 | Ezra et al. | | 359/621 |
| 5,684,354 A * | 11/1997 | Gleckman | | 313/110 |
| 5,715,029 A * | 2/1998 | Fergason | | 349/196 |
| 5,717,422 A * | 2/1998 | Fergason | | 345/102 |
| 5,724,062 A * | 3/1998 | Hunter | | 345/102 |
| 5,729,242 A * | 3/1998 | Margerum et al. | | 345/7 |
| 5,748,828 A * | 5/1998 | Steiner et al. | | 385/146 |
| 5,784,181 A * | 7/1998 | Loiseaux et al. | | 359/1 |
| 5,809,215 A * | 9/1998 | Heydinger et al. | | 358/1.9 |
| 5,815,303 A * | 9/1998 | Berlin | | 359/196.1 |
| 5,889,567 A * | 3/1999 | Swanson et al. | | 349/62 |
| 5,892,325 A * | 4/1999 | Gleckman | | 313/578 |
| 5,926,239 A * | 7/1999 | Kumar et al. | | 349/69 |
| 5,959,777 A * | 9/1999 | Whitehead | | 359/618 |
| 5,978,142 A * | 11/1999 | Blackham et al. | | 359/618 |
| 5,986,628 A * | 11/1999 | Tuenge et al. | | 345/76 |
| 6,043,591 A * | 3/2000 | Gleckman | | 313/110 |
| 6,111,559 A * | 8/2000 | Motomura et al. | | 345/102 |
| 6,111,560 A * | 8/2000 | May | | 345/102 |
| 6,120,588 A * | 9/2000 | Jacobson | | 106/31.16 |
| 6,120,839 A * | 9/2000 | Comiskey et al. | | 427/213.3 |
| 6,144,162 A * | 11/2000 | Smith | | 315/169.1 |
| 6,163,621 A * | 12/2000 | Paik et al. | | 382/169 |
| 6,172,798 B1 * | 1/2001 | Albert et al. | | 359/296 |
| 6,184,969 B1 * | 2/2001 | Fergason | | 349/196 |
| 6,215,920 B1 * | 4/2001 | Whitehead et al. | | 385/18 |
| 6,229,558 B1 * | 5/2001 | Saigo et al. | | 347/232 |
| 6,229,588 B1 | 5/2001 | Abileah et al. | | |
| 6,243,055 B1 * | 6/2001 | Fergason | | 345/32 |
| 6,243,068 B1 * | 6/2001 | Evanicky et al. | | 345/102 |
| 6,268,843 B1 * | 7/2001 | Arakawa | | 345/102 |
| 6,276,801 B1 * | 8/2001 | Fielding | | 353/31 |
| 6,300,932 B1 * | 10/2001 | Albert | | 345/107 |
| 6,323,989 B1 * | 11/2001 | Jacobson et al. | | 359/296 |
| 6,327,072 B1 * | 12/2001 | Comiskey et al. | | 359/296 |
| 6,381,372 B1 * | 4/2002 | Loce | | 382/261 |
| 6,414,661 B1 * | 7/2002 | Shen et al. | | 345/82 |
| 6,428,189 B1 * | 8/2002 | Hochstein | | 362/373 |
| 6,435,691 B1 * | 8/2002 | Macey et al. | | 362/101 |
| 6,437,769 B1 * | 8/2002 | Kobayashi et al. | | 345/102 |
| 6,439,731 B1 * | 8/2002 | Johnson et al. | | 362/29 |
| 6,448,588 B1 * | 9/2002 | Sakaguchi et al. | | 345/88 |
| 6,448,955 B1 * | 9/2002 | Evanicky et al. | | 345/102 |
| 6,483,643 B1 * | 11/2002 | Zuchowski | | 359/443 |
| 6,520,646 B2 * | 2/2003 | Rodriguez et al. | | 353/69 |
| 6,590,561 B1 * | 7/2003 | Kabel et al. | | 345/102 |
| 6,608,614 B1 * | 8/2003 | Johnson | | 345/102 |
| 6,618,115 B1 | 9/2003 | Hiroko | | |
| 6,621,482 B2 * | 9/2003 | Fuller | | 345/102 |
| 6,631,995 B2 * | 10/2003 | Stanton et al. | | 353/84 |
| 6,644,832 B2 * | 11/2003 | Yoshida et al. | | 362/241 |
| 6,654,156 B1 * | 11/2003 | Crossland et al. | | 359/290 |
| 6,657,607 B1 * | 12/2003 | Evanicky et al. | | 345/88 |
| 6,671,008 B1 * | 12/2003 | Li et al. | | 349/16 |
| 6,680,834 B2 * | 1/2004 | Williams | | 361/58 |
| 6,683,657 B1 * | 1/2004 | Miyawaki | | 348/743 |
| 6,728,023 B1 * | 4/2004 | Alioshin et al. | | 359/290 |
| 6,753,661 B2 * | 6/2004 | Muthu et al. | | 315/307 |
| 6,796,658 B2 * | 9/2004 | Hubel et al. | | 353/31 |
| 6,803,901 B1 * | 10/2004 | Numao | | 345/102 |
| 6,816,141 B1 * | 11/2004 | Fergason | | 345/88 |
| 6,817,717 B2 * | 11/2004 | Childers et al. | | 353/31 |
| 6,831,624 B1 * | 12/2004 | Harrold | | 345/98 |
| 6,831,711 B2 * | 12/2004 | Choi et al. | | 349/74 |
| 6,863,401 B2 * | 3/2005 | Penn | | 353/31 |
| 6,888,663 B2 * | 5/2005 | Bourdelais et al. | | 359/296 |
| 6,891,672 B2 * | 5/2005 | Whitehead et al. | | 359/443 |
| 6,952,195 B2 * | 10/2005 | Arakawa | | 345/102 |
| 6,980,176 B2 * | 12/2005 | Matsumoto et al. | | 345/6 |
| 6,980,195 B2 * | 12/2005 | Lonoce et al. | | 345/102 |
| 6,985,272 B2 * | 1/2006 | Bridgwater et al. | | 359/237 |
| 7,002,533 B2 * | 2/2006 | Sayag | | 345/7 |
| 7,018,046 B2 * | 3/2006 | Childers et al. | | 353/31 |
| 7,050,122 B2 * | 5/2006 | Gibbon et al. | | 348/771 |
| 7,052,152 B2 * | 5/2006 | Harbers et al. | | 362/30 |
| 7,053,881 B2 * | 5/2006 | Itoh | | 345/102 |
| 7,064,740 B2 * | 6/2006 | Daly | | 345/102 |
| 7,071,907 B1 * | 7/2006 | Duboc et al. | | 345/87 |
| 7,106,505 B2 * | 9/2006 | Whitehead et al. | | 359/443 |
| 7,118,225 B2 * | 10/2006 | Penn | | 353/84 |
| 7,172,297 B2 * | 2/2007 | Whitehead et al. | | 353/121 |
| 7,175,281 B1 * | 2/2007 | Berman | | 353/31 |
| 7,403,332 B2 * | 7/2008 | Whitehead et al. | | 359/443 |
| 7,413,309 B2 * | 8/2008 | Whitehead et al. | | 353/30 |
| 7,419,267 B2 | 9/2008 | Whitehead | | |
| 7,532,192 B2 * | 5/2009 | Feng et al. | | 345/102 |
| 7,942,531 B2 | 5/2011 | Whitehead et al. | | |
| 8,172,401 B2 | 5/2012 | Whitehead et al. | | |
| 2001/0019390 A1 * | 9/2001 | Itoh et al. | | 349/130 |
| 2001/0035853 A1 * | 11/2001 | Hoelen et al. | | 345/102 |
| 2001/0043179 A1 * | 11/2001 | Yoshinaga et al. | | 345/87 |
| 2002/0003522 A1 * | 1/2002 | Baba et al. | | 345/89 |
| 2002/0050957 A1 | 5/2002 | Nagano | | |
| 2002/0050958 A1 * | 5/2002 | Matthies et al. | | 345/55 |
| 2002/0057238 A1 * | 5/2002 | Nitta et al. | | 345/87 |
| 2002/0057253 A1 | 5/2002 | Lim et al. | | |
| 2002/0135553 A1 * | 9/2002 | Nagai et al. | | 345/89 |
| 2002/0159002 A1 * | 10/2002 | Chang | | 349/61 |
| 2002/0163606 A1 * | 11/2002 | Kitai et al. | | 349/98 |
| 2002/0171617 A1 * | 11/2002 | Fuller | | 345/102 |
| 2003/0048393 A1 * | 3/2003 | Sayag | | 349/5 |
| 2003/0085857 A1 | 5/2003 | Ramanujan | | |
| 2003/0090455 A1 * | 5/2003 | Daly | | 345/102 |
| 2003/0137501 A1 * | 7/2003 | Richards | | 345/204 |
| 2003/0151569 A1 * | 8/2003 | Lee et al. | | 345/84 |
| 2003/0206245 A1 * | 11/2003 | Lin et al. | | 348/631 |
| 2004/0012551 A1 * | 1/2004 | Ishii | | 345/87 |
| 2004/0057017 A1 * | 3/2004 | Childers et al. | | 353/31 |
| 2004/0218388 A1 * | 11/2004 | Suzuki | | 362/231 |
| 2005/0083295 A1 * | 4/2005 | Daly | | 345/102 |
| 2005/0083296 A1 * | 4/2005 | Daly | | 345/102 |
| 2005/0162737 A1 * | 7/2005 | Whitehead et al. | | 359/454 |
| 2005/0248554 A1 * | 11/2005 | Feng et al. | | 345/204 |
| 2005/0285841 A1 * | 12/2005 | Lin | | 345/102 |
| 2006/0028156 A1 * | 2/2006 | Jungwirth | | 315/312 |
| 2006/0092183 A1 * | 5/2006 | Malmberg | | 345/690 |
| 2006/0125745 A1 * | 6/2006 | Evanicky | | 345/84 |
| 2006/0227085 A1 * | 10/2006 | Boldt et al. | | 345/83 |
| 2006/0232969 A1 * | 10/2006 | Bogner et al. | | 362/252 |
| 2007/0024576 A1 * | 2/2007 | Hassan | | 345/156 |
| 2007/0035706 A1 * | 2/2007 | Margulis | | 353/122 |
| 2007/0097321 A1 * | 5/2007 | Whitehead et al. | | 353/30 |
| 2007/0126992 A1 * | 6/2007 | Penn | | 353/84 |
| 2007/0132956 A1 * | 6/2007 | Whitehead et al. | | 353/30 |
| 2007/0146257 A1 * | 6/2007 | Whitehead et al. | | 345/84 |
| 2007/0247833 A1 * | 10/2007 | Lee et al. | | 362/97 |
| 2007/0268211 A1 * | 11/2007 | Whitehead et al. | | 345/55 |

| | | | |
|---|---|---|---|
| 2007/0268224 A1* | 11/2007 | Whitehead et al. ............. 345/84 |
| 2007/0268577 A1* | 11/2007 | Whitehead et al. ............. 359/443 |
| 2008/0018985 A1* | 1/2008 | Whitehead et al. ............. 359/298 |
| 2008/0030449 A1* | 2/2008 | Lee et al. ........................ 345/89 |
| 2008/0043034 A1* | 2/2008 | Whitehead et al. ............. 345/617 |
| 2008/0043303 A1* | 2/2008 | Whitehead et al. ............. 359/19 |
| 2008/0074060 A1* | 3/2008 | Ye et al. ......................... 315/307 |
| 2008/0150878 A1* | 6/2008 | Kang ............................. 345/102 |
| 2008/0150879 A1* | 6/2008 | Kang ............................. 345/102 |
| 2012/0120131 A1 | 5/2012 | Whitehead et al. |

FOREIGN PATENT DOCUMENTS

| | | |
|---|---|---|
| EP | 0829747 A1 | 3/1998 |
| EP | 1003064 A1 | 5/2000 |
| EP | 1098291 A2 | 5/2001 |
| EP | 1136874 A1 | 9/2001 |
| EP | 1202244 A1 | 5/2002 |
| EP | 1431653 A2 | 6/2004 |
| EP | 1521235 A2 | 4/2005 |
| FR | 2702299 | 9/1994 |
| JP | S60-54120 A2 | 4/1985 |
| JP | S60-54174 A2 | 4/1985 |
| JP | 62-234185 A | 10/1987 |
| JP | S62-234133 A2 | 10/1987 |
| JP | H2-162389 A2 | 6/1990 |
| JP | H3-71111 A1 | 3/1991 |
| JP | H3-198026 A1 | 8/1991 |
| JP | H4-204591 A2 | 7/1992 |
| JP | H7-121120 A2 | 5/1995 |
| JP | H8-334742 A1 | 12/1996 |
| JP | 09-189893 A | 7/1997 |
| JP | H10-269802 A2 | 10/1998 |
| JP | H11-52412 A | 2/1999 |
| JP | H11-064820 A2 | 3/1999 |
| JP | 2000-35576 A1 | 2/2000 |
| JP | 2000-214827 A2 | 8/2000 |
| JP | 2000-275595 A | 10/2000 |
| JP | 2001-100689 A | 4/2001 |
| JP | 2002-91385 A1 | 3/2002 |
| JP | 2002-99250 A2 | 4/2002 |
| JP | 2002-140038 | 5/2002 |
| JP | 2005-520188 | 7/2005 |
| JP | 2009-053370 | 3/2009 |
| WO | 91/15843 A2 | 10/1991 |
| WO | 96/33483 A1 | 10/1996 |
| WO | 99/19767 A1 | 4/1999 |
| WO | 00/23831 A1 | 4/2000 |
| WO | 00/40018 A1 | 7/2000 |
| WO | 00/75720 A2 | 12/2000 |
| WO | 01/69584 A1 | 9/2001 |
| WO | 01/69941 A2 | 9/2001 |
| WO | 02/03687 A2 | 1/2002 |
| WO | 02/069030 A2 | 9/2002 |
| WO | 02/079862 A2 | 10/2002 |
| WO | 03/077013 A2 | 9/2003 |
| WO | 2004031844 A1 | 4/2004 |
| WO | 2005101309 A1 | 10/2005 |
| WO | 2006010244 A1 | 2/2006 |
| WO | 2006115852 A2 | 11/2006 |

OTHER PUBLICATIONS

International Search Report and Written Opinion for PCT/US07/02788 filed Jan. 31, 2007.

Suzuki, Y., "Liquid Crystal Applications", Television Technology Institute Reports, 1983.

Ohara, A., "Backlight for Liquid Crystal Displays", J. Illum. Institute of Japan, 1989, vol. 73(12).

Mitsuhashi, Y. "Regarding LED Backlight Systems for LCDs", Television Technology Institute Reports, 1986.

Endo, N., "Transmissive Type Liquid Crystal Display Device", Toshiba Technology Publication Collection, 1996.

Funamoto, T. et al., "Technology for LCD Televisions with High Image Quality", Matsushita Technical Journal, 2000 vol. 46(3).

Ward, Greg, "A Wide Field, High Dynamic Range, Stereographic Viewer", 2003.

Ward, Greg, "A Wide-Field Stereoscopic High Dynamic Range Viewer", Mar. 30, 2001.

* cited by examiner

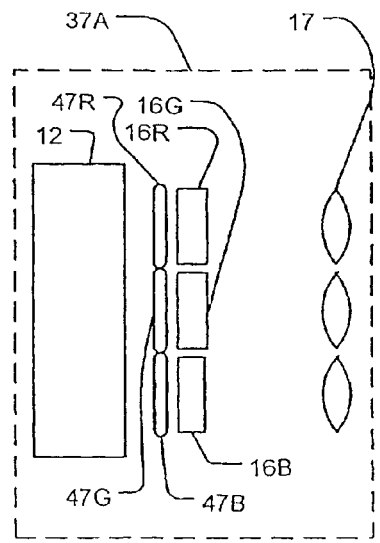
FIGURE 6
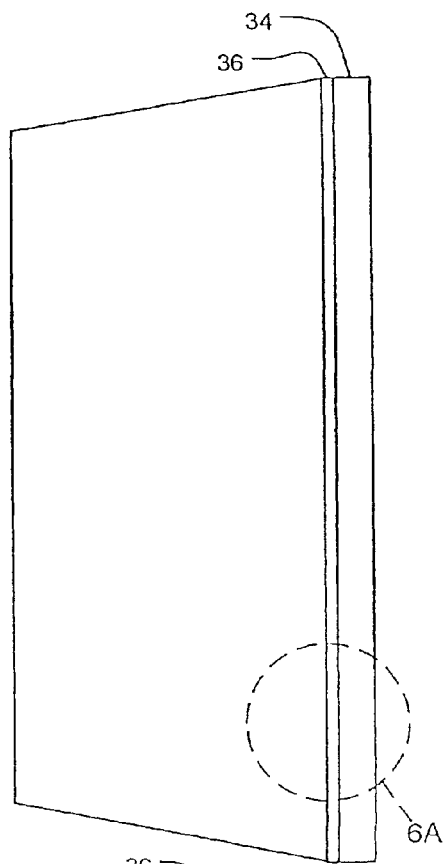
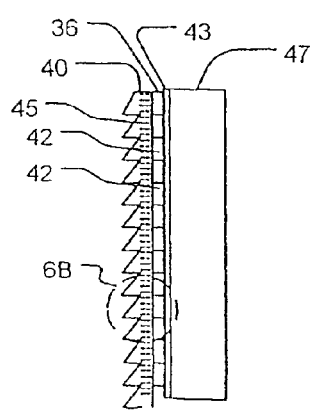
FIGURE 6A
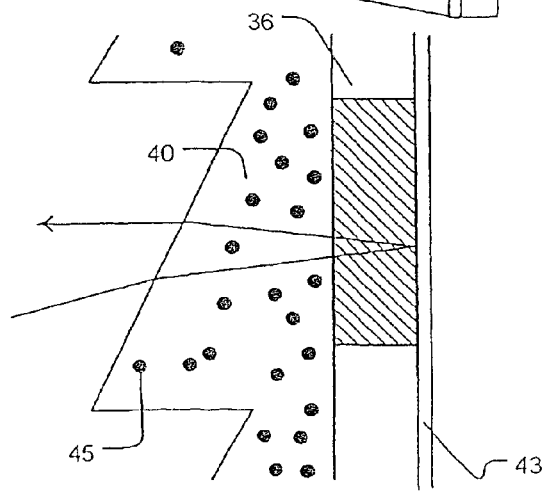
FIGURE 6B

US 8,277,056 B2

LOCALLY DIMMED DISPLAY

The claimed invention was made as a result of activities undertaken within the scope of a joint research agreement as defined under 35 U.S.C. 103(c) between the National Sciences and Engineering Research Council of Canada, Lorne Whitehead of the University of British Columbia, Wolfgang Stuerzlinger and Hugh Wilson of York University, and Avi Chaudhuri of McGill University.

CROSS REFERENCE TO RELATED APPLICATIONS

This application is a continuation of U.S. patent application Ser. No. 13/097,823 filed 29 Apr. 2011, which is a continuation of U.S. patent application Ser. No. 12/855,918 filed on 13 Aug. 2010, which is a continuation of U.S. patent application Ser. No. 12/410,125 filed on 24 Mar. 2009, which is a continuation of U.S. patent application Ser. No. 11/831,749 filed on 31 Jul. 2007, which is a continuation of U.S. patent application Ser. No. 11/702,839 filed on 5 Feb. 2007, which is a continuation of U.S. patent application Ser. No. 11/351,962 filed on 10 Feb. 2006, which is a continuation of U.S. patent application Ser. No. 11/112,428 filed on 22 Apr. 2005, which is a divisional of U.S. patent application Ser. No. 10/469,473 (accorded the filing date of 27 Aug. 2003), which is the U.S. National Stage of International Application No. PCT/CA2002/000255 filed on 27 Feb. 2002 and entitled HIGH DYNAMIC RANGE DISPLAY DEVICES, which claims the benefit of the filing date of U.S. provisional patent application No. 60/271,563 filed on 27 Feb. 2001 and entitled HIGH DYNAMIC RANGE COLOUR DISPLAY AND PROJECTION TECHNOLOGY.

TECHNICAL FIELD

The invention relates to displays for displaying digital images.

BACKGROUND

Dynamic range is the ratio of intensity of the highest luminance parts of a scene and the lowest luminance parts of a scene. For example, the image projected by a video projection system may have a maximum dynamic range of 300:1.

The human visual system is capable of recognizing features in scenes which have very high dynamic ranges. For example, a person can look into the shadows of an unlit garage on a brightly sunlit day and see details of objects in the shadows even though the luminance in adjacent sunlit areas may be thousands of times greater than the luminance in the shadow parts of the scene. To create a realistic rendering of such a scene can require a display having a dynamic range in excess of 1000:1. The term "high dynamic range" means dynamic ranges of 800:1 or more.

Modern digital imaging systems are capable of capturing and recording digital representations of scenes in which the dynamic range of the scene is preserved.

Computer imaging systems are capable of synthesizing images having high dynamic ranges. However, current display technology is not capable of rendering images in a manner which faithfully reproduces high dynamic ranges.

Blackham et al., U.S. Pat. No. 5,978,142 discloses a system for projecting an image onto a screen. The system has first and second light modulators which both modulate light from a light source. Each of the light modulators modulates light from the source at the pixel level. Light modulated by both of the light modulators is projected onto the screen.

Gibbon et al., PCT application No. PCT/US01/21367 discloses a projection system which includes a pre modulator. The pre modulator controls the amount of light incident on a deformable mirror display device. A separate pre-modulator may be used to darken a selected area (e.g. a quadrant).

There exists a need for cost effective displays capable of reproducing a wide range of light intensities in displayed images.

SUMMARY OF THE INVENTION

This invention provides displays for displaying images and methods for displaying images. One aspect of the invention provides a display comprising: a light source; a first spatial light modulator located to modulate light from the light source; a display screen comprising a second spatial light modulator; and, an optical system configured to image light modulated by the first spatial light modulator onto a first face of the display screen.

Another aspect of the invention provides a display comprising: a light source; a first spatial light modulator located to modulate light from the light source, the first spatial light modulator comprising an array of controllable pixels; and, a second spatial light modulator located to modulate light modulated by the first spatial light modulator the second spatial light modulator comprising an array of controllable pixels; wherein each pixel of one of the first and second spatial light modulators corresponds to a plurality of pixels of the other one of the first and second light modulators.

Another aspect of the invention provides a display device comprising: first spatial modulation means for providing light spatially modulated at a first spatial resolution; second spatial modulation means for further spatially modulating the light at a second resolution different from the first resolution; and, means for controlling the first and second spatial modulation means to display an image defined by image data.

A still further aspect of the invention provides a method for displaying an image having a high dynamic range. The method comprises: generating light, spatially modulating the light according to image data in a first light modulating step; and, imaging the spatially modulated light onto a screen comprising a light modulator.

Further aspects of the invention and features of specific embodiments of the invention are described below.

BRIEF DESCRIPTION OF THE DRAWINGS

In drawings which illustrate non-limiting embodiments of the invention,

FIG. 6 is a schematic illustration of a front-projection-type color display having an alternative projector construction;

FIGS. 6A and 6B are expanded cross-sectional views of portions of the front-projection screen of the color display of FIG. 6;

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

This invention provides displays capable of rendering images with high dynamic ranges. Displays according to the invention comprise two light modulating stages. Light passes through the stages in series to provide an image which has an increased dynamic range.

Figure 1:
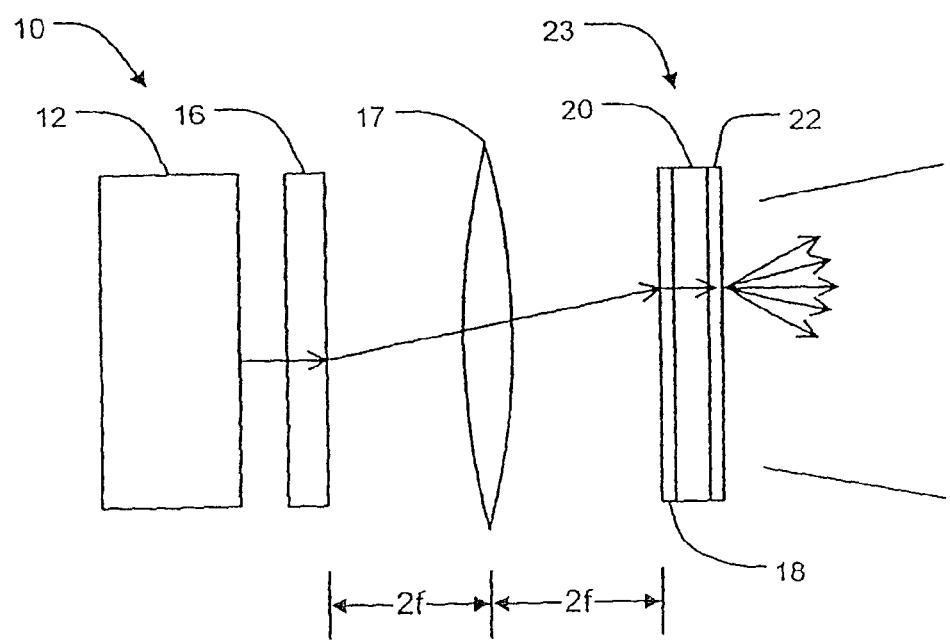
FIG. 1 is a schematic illustration of a display according to one embodiment of the invention.

FIG. 1 illustrates schematically a display 10 according to a simple embodiment of the invention. The sizes of elements and distances between them in FIG. 1 are not to scale. Display 10 comprises a light source 12. Light source 12 may, for example, comprise a projection lamp such as an incandescent lamp or an arc lamp, a laser, or another suitable source of light. Light source 12 may comprise an optical system comprising one or more mirrors, lenses or other optical elements which cooperate to deliver light to the rest of display 10.

In the illustrated embodiment, light from light source 12 is directed toward a first light modulator 16. Light source 12 preferably provides substantially uniform illumination of first light modulator 16. Light modulator 16 comprises an array of individually addressable elements. Light modulator 16 may comprise, for example, a LCD (liquid crystal display), which is an example of a transmission-type light modulator or a DMD (deformable mirror device), which is an example of a reflection-type light modulator. Display driver circuitry (not shown in FIG. 1) controls the elements of light modulator 16 according to data which defines an image being displayed.

Light which has been modulated by first light modulator 16 is imaged onto a rear-projection screen 23 by a suitable optical system 17. Light from a small area of first light modulator 16 is directed by optical system 17 to a corresponding area on rear-projection screen 23. In the illustrated embodiment, optical system 17 comprises a lens having a focal length f. In general, the optical system 17 which images light modulated by first light modulator 16 onto rear-projection screen 23 may comprise one or more mirrors, lenses or other optical elements. Such an optical system has the function of imaging light modulated by the first light modulator onto a second light modulator.

In the illustrated embodiment, rear-projection screen 23 comprises a second light modulator 20 and a collimator 18. A main function of collimator 18 is to cause light which passes through rear-projection screen 23 to be directed preferentially toward a viewing area. Collimator 18 may comprise a Fresnel lens, a holographic lens, or, in the alternative, another arrangement of one or more lenses and/or other optical elements which will guide light in the direction of a viewing area.

In the illustrated embodiment, collimator 18 causes light to travel through the elements of second light modulator 20 in a direction which is generally normal to screen 23. As light incident from collimator 18 travels through second light modulator 20 it is further modulated. The light then passes to a diffuser 22 which scatters the outgoing light through a range of directions so that a viewer located on an opposite side of diffuser 22 from first light modulator 16 can see light originating from the whole area of screen 23. In general, diffuser 22 may scatter light to a different angular extent in the horizontal and vertical planes. Diffuser 22 should be selected so that light modulated by second light modulator 20 is scattered through a range of angles such that the maximum scatter angle is at least equal to the angle subtended by screen 23 when viewed from a desired viewing location.

Rear-projection screen 23 may differ in area from first light modulator 16. For example, rear-projection screen 23 may be larger in area than first light modulator 16. Where this is the case, optical system 17 expands the beam of light modulated by first light modulator 16 to illuminate a larger corresponding area on rear-projection screen 23.

Second light modulator 20 may be of the same type as first light modulator 16 or a different type. Where first and second light modulators 16 and 20 are both of types that polarize light, second light modulator 20 should, as much as is practical, be oriented so that its plane of polarization matches that of the light incident on it from first light modulator 16.

Display 10 may be a color display. This may be achieved in various ways including:

making one of first light modulator 16 and second light modulator 20 a color light modulator;

providing a plurality of different first light modulators 16 operating in parallel on different colors; and, providing a mechanism for rapidly introducing different color filters into the light path ahead of second light modulator 20.

As an example of the first approach above, second light modulator 20 may comprise an LCD panel having a plurality of pixels each comprising a number of colored sub-pixels. For example, each pixel may comprise three sub-pixels, one associated with a red filter, one associated with a green filter and one associated with a blue filter. The filters may be integral with the LCD panel.

Figure 1A:
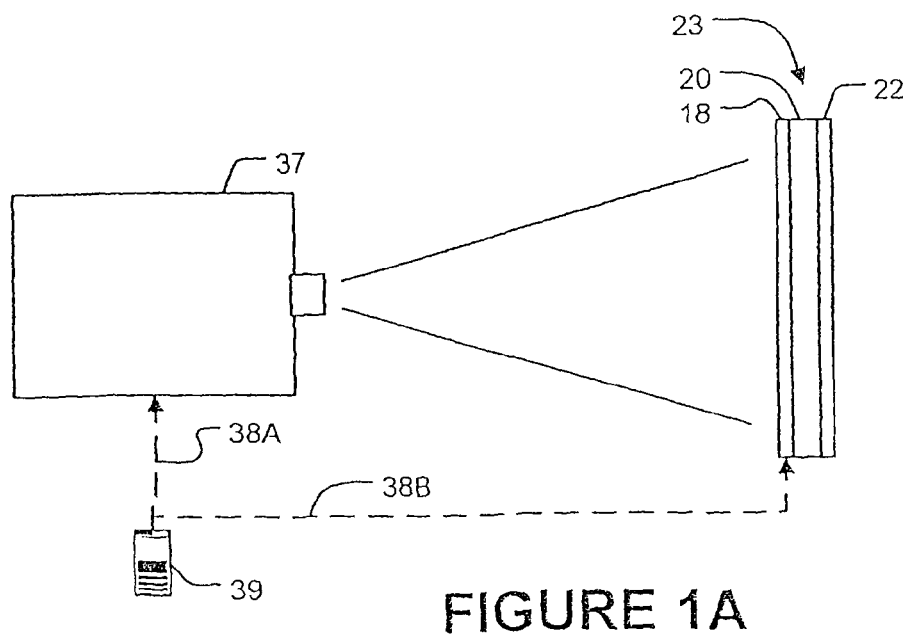
FIG. 1A is a schematic illustration of a specific implementation of the display of FIG. 1.

As shown in FIG. 1A, Light source 12, first light modulator 16 and optical system 17 may all be parts of a digital video projector 37 located to project an image defined by a signal 38A from a controller 39 onto the back side of rear-projection screen 23. The elements of second light modulator 20 are controlled by a signal 38B from controller 39 to provide an image to a viewer which has a high dynamic range.

Figure 2:
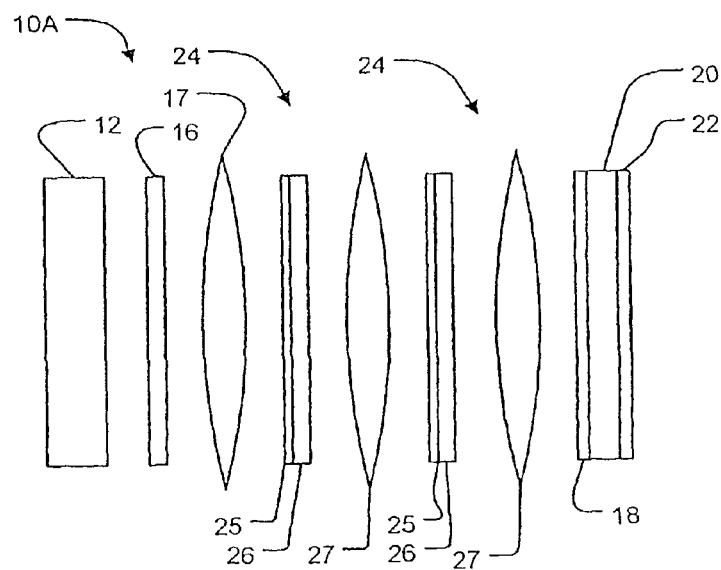
FIG. 2 is a schematic illustration of a display according to an alternative embodiment of the invention comprising four spatial light modulators.

As shown in FIG. 2, a display 10A according to the invention may comprise one or more additional light modulation stages 24. Each additional light modulation stage 24 comprises a collimator 25, a light modulator 26 and an optical system 27 which focuses light from light modulator 26 onto either the next additional light modulation stage 24 or on collimator 18. In device 10A of FIG. 2 there are two additional light modulation stages 24. Devices according to this embodiment of the invention may have one or more additional light modulation stages 24.

The luminance of any point on output diffuser 22 can be adjusted by controlling the amount of light passed on by corresponding elements of light modulators 16, 20 and 26. This control may be provided by a suitable control system (not shown in FIG. 2) connected to drive each of light modulators 16, 20 and 26.

Figure 3:
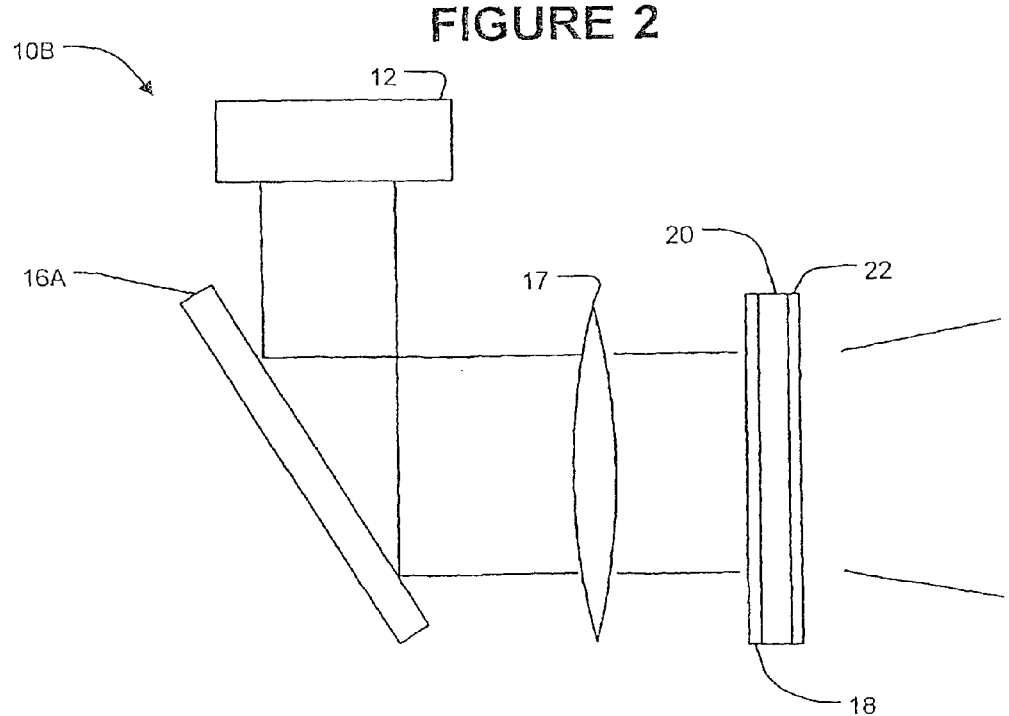
FIG. 3 is a schematic illustration of a rear-projection-type display according to a further embodiment of the invention.

As noted above, light modulators 16, 20 and 26 may all be of the same type or may be of two or more different types. FIG. 3 illustrates a display 10B according to an alternative embodiment of the invention which includes a first light modulator 16A which comprises a deformable mirror device. A deformable mirror device is a "binary" device in the sense that each pixel may be either "on" or "off". Different apparent brightness levels may be produced by turning a pixel on and off rapidly. Such devices are described, for example, in U.S. Pat. Nos. 4,441,791 and, 4,954,789 and are commonly used in digital video projectors. Light source 12 and first light modulator 16 (or 16A) may be the light source and modulator from a commercial digital video projector, for example.

Figure 4:
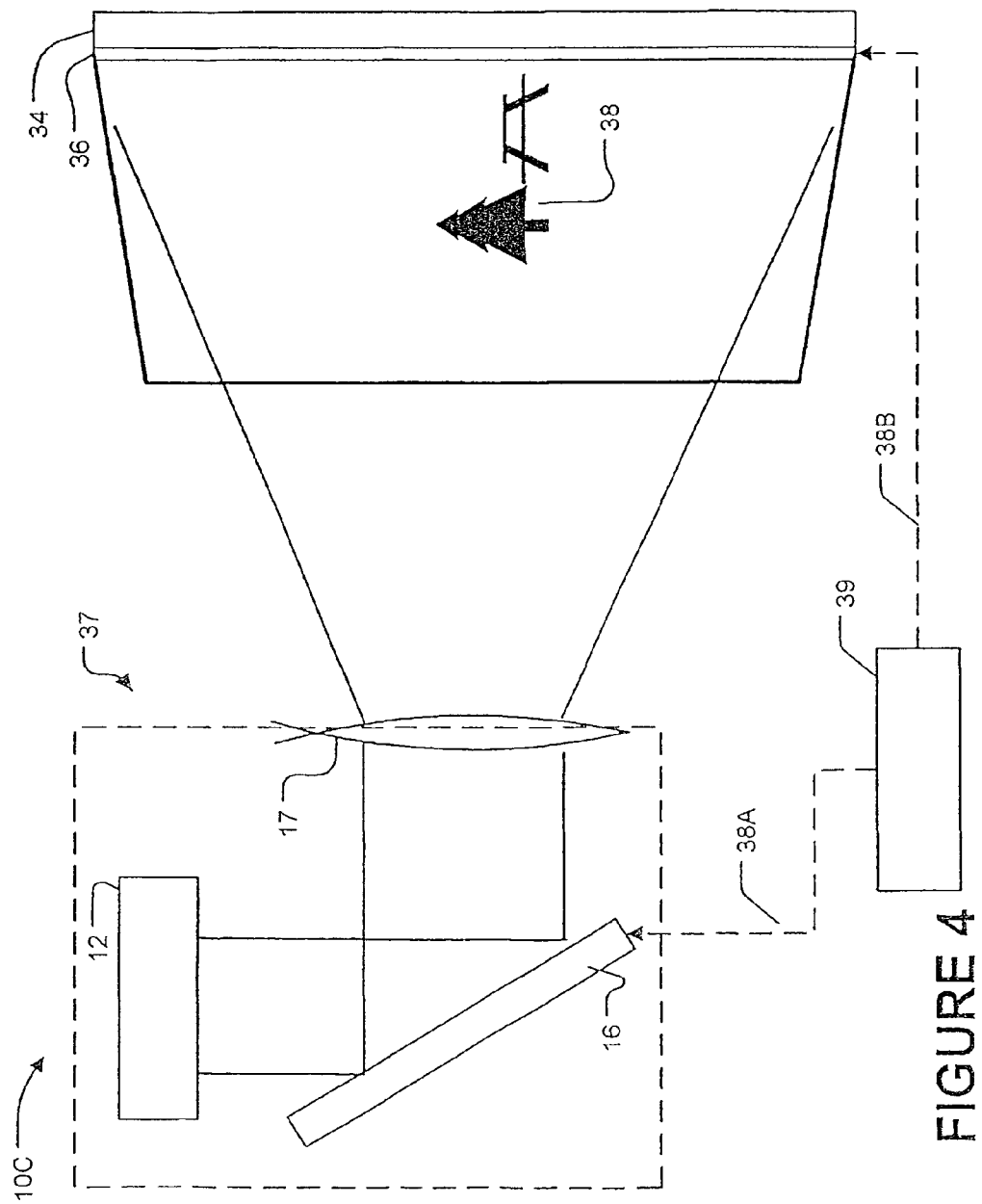
FIG. 4 is a schematic illustration of a front-projection-type display according to a still further embodiment of the invention.

FIG. 4 illustrates a front-projection-type display 10C according to the invention. Display 10C comprises a screen 34. A projector 37 projects an image 38 onto screen 34. Projector 37 comprises a suitable light source 12, a first light modulator 16 and an optical system 17 suitable for projecting an image defined by first light modulator 16 onto screen 34. Projector 37 may comprise a commercially available display projector. Screen 34 incorporates a second light modulator 36. Second light modulator 36 comprises a number of addressable elements which can be individually controlled to affect the luminance of a corresponding area of screen 34.

Light modulator 36 may have any of various constructions. For example, light modulator 36 may comprise an array of LCD elements each having a controllable transmissivity located in front of a reflective backing. Light projected by projector 37 passes through each LCD element and is reflected back through the LCD element by the reflective backing. The luminance at any point on screen 34 is determined by the intensity of light received at that point by projector 37 and the degree to which light modulator 36 (e.g. the LCD element at that point) absorbs light being transmitted through it.

Light modulator 36 could also comprise an array of elements having variable retro-reflection properties. The elements may be prismatic. Such elements are described, for example, in Whitehead, U.S. Pat. No. 5,959,777 entitled Passive High Efficiency Variable Reflectivity Image Display Device and, Whitehead et al., U.S. Pat. No. 6,215,920 entitled Electrophoretic, High Index and Phase Transition Control of Total Internal Reflection in High Efficiency Variable Reflectivity Image Displays.

Light modulator 36 could also comprise an array of electrophoretic display elements as described, for example, in Albert et al., U.S. Pat. No. 6,172,798 entitled Shutter Mode Microencapsulated Electrophoretic Display; Comiskey et al., U.S. Pat. No. 6,120,839 entitled Electro-osmotic Displays and Materials for Making the Same; Jacobson, U.S. Pat. No. 6,120,588 entitled: Electronically Addressable Microencapsulated Ink and Display; Jacobson et al., U.S. Pat. No. 6,323,989 entitled Electrophoretic Displays Using Nanoparticles; Albert, U.S. Pat. No. 6,300,932 entitled Electrophoretic Displays with Luminescent Particles and Materials for Making the Same or, Comiskey et al., U.S. Pat. No. 6,327,072 entitled Microcell Electrophoretic Displays.

As shown in FIGS. 6A and 6B, screen 34 preferably comprises a lens element 40 which functions to direct light preferentially toward the eyes of viewers. In the illustrated embodiment, lens element 40 comprises a Fresnel lens having a focal point substantially coincident with the apex of the cone of light originating from projector 37. Lens element 40 could comprise another kind of lens such as a holographic lens. Lens element 40 incorporates scattering centers 45 which provide a desired degree of diffusion in the light reflected from screen 34. In the illustrated embodiment, second light modulator 36 comprises a reflective LCD panel having a large number of pixels 42 backed by a reflective layer 43 and mounted on a backing 47.

Where light modulator 36 comprises an array of elements having variable retro-reflection properties, the elements themselves could be designed to direct retro-reflected light preferentially in a direction of a viewing area in front of screen 34. Reflective layer 43 may be patterned to scatter light to either augment the effect of scattering centers 45 or replace scattering centers 45.

As shown in FIG. 4, a controller 39 provides data defining image 38 to each of first light modulator 16 and second light modulator 36. Controller 39 could comprise, for example, a computer equipped with a suitable display adapter. Controller 39 may comprise image processing hardware to accelerate image processing steps. The luminance of any point on screen 34 is determined by the combined effect of the pixels in first light modulator 16 and second light modulator 36 which correspond to that point. There is minimum luminance at points for which corresponding pixels of the first and second light modulators are set to their "darkest" states. There is maximum luminance at points for which corresponding pixels of the first and second light modulators are set to their "brightest" states. Other points have intermediate luminance values. The maximum luminance value might be, for example, on the order of $10^5$ cd/m$^2$. The minimum luminance value might be, for example on the order of $10^{-2}$ cd/m$^2$.

The cost of a light modulator and its associated control circuitry tends to increase with the number of addressable elements in the light modulator. In some embodiments of the invention one of the light modulators has a spatial resolution significantly higher than that of one or more other ones of the light modulators. When one or more of the light modulators are lower-resolution devices the cost of a display according to such embodiments of the invention may be reduced. In color displays comprising two or more light modulators, one of which is a color light modulator (a combination of a plurality of monochrome light modulators may constitute a color light modulator as shown, for example, in FIG. 6) and one of which is a higher-resolution light modulator, the higher-resolution light modulator should also be the color light modulator. In some embodiments the higher-resolution light modulator is imaged onto the lower-resolution light modulator. In other embodiments the lower-resolution light modulator is imaged onto the higher-resolution light modulator.

Figure 5:
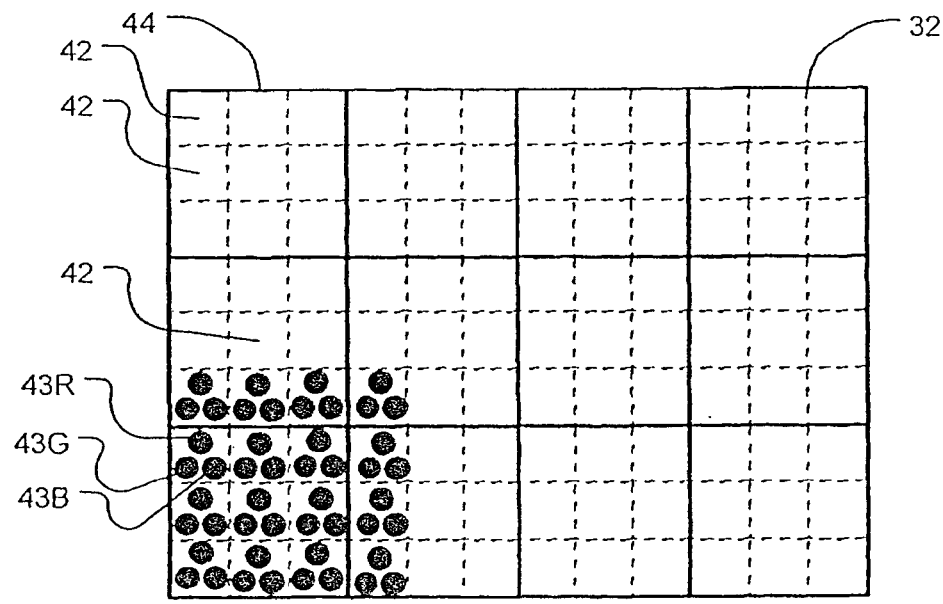
FIG. 5 is a drawing illustrating a possible relationship between pixels in a higher-resolution spatial light modulator and pixels in a lower-resolution spatial light modulator in a display according to the invention.

FIG. 5 illustrates one possible configuration of pixels in a display 10 as shown in FIG. 1. Nine pixels 42 of a second light modulator 20 correspond to each pixel 44 of a first light modulator 16. The number of pixels 42 of second light modulator 20 which correspond to each pixel 44 of first light modulator 16 may be varied as a matter of design choice. Pixels 44 of the higher-resolution one of first and second light modulators 16 and 20 (or 36) should be small enough to provide a desired overall resolution. In general there is a trade off between increasing resolution and increasing cost. In a typical display the higher-resolution light modulator will provide an array of pixels having at least a few hundred pixels in each direction and more typically over 1000 pixels in each direction.

Figure 5A:
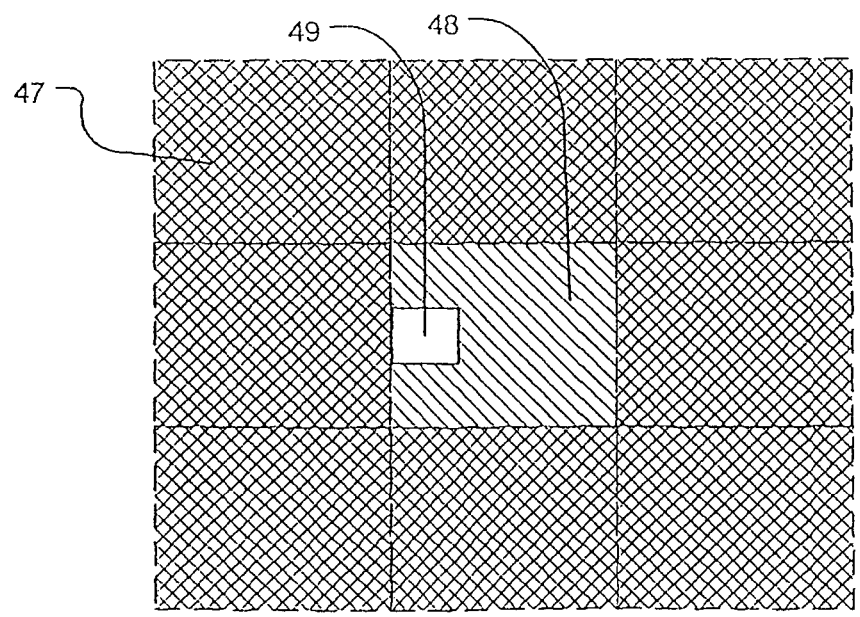
FIG. 5A illustrates an effect of providing one light modulator which has lower resolution than another light modulator.

The size of pixels 42 of the lower-resolution one of the first and second light modulators determines the scale over which one can reliably go from maximum intensity to minimum intensity. Consider, for example, FIG. 5A which depicts a situation where one wishes to display an image of a small maximum-luminance spot on a large minimum-luminance background. To obtain maximum luminance in a spot 47, those pixels of each of the first and second light modulators which correspond to spot 47 should be set to their maximum-luminance values. Where the pixels of one light modulator are lower in resolution than pixels of the other light modulator then some pixels of the lower-resolution light modulator will straddle the boundary of spot 47. This is the case, for example, in FIG. 5A.

Outside of spot 47 there are two regions. In region 48 it is not possible to set the luminance to its minimum value because in that region the lower-resolution light modulator is set to its highest luminance value. In region 49 both of the light modulators can be set to their lowest-luminance values. If, for example, each of the first and second light modulators has a luminance range of 1 to 100 units, then region 47 might have a luminance of 100×100=10,000 units, region 48 would have a luminance of 100×1=100 units and region 49 would have a luminance of 1×1=1 units.

As a result of having one of the light modulators lower in resolution than the other, each pixel of the lower-resolution light modulator corresponds to more than one pixel in the higher-resolution light modulator. It is not possible for points corresponding to any one pixel of the lower-resolution light modulator and different pixels of the higher-resolution light modulator to have luminance values at extremes of the device's dynamic range. The maximum difference in luminance between such points is determined by the dynamic range provided by the higher-resolution light modulator.

It is generally not a problem that a display is not capable of causing closely-spaced points to differ in luminance from one another by the full dynamic range of the display. The human eye has enough intrinsic scatter that it is incapable of appreciating large changes in luminance which occur over very short distances in any event.

In a display according to the invention which includes both a lower-resolution spatial light modulator and a higher-resolution spatial light modulator, controller 39 may determine a value for each pixel of the lower-resolution spatial light modulator and adjust the signals which control the higher-resolution spatial light modulator to reduce artifacts which result from the fact that each pixel of the lower-resolution spatial light modulator is common to a plurality of pixels of the higher-resolution spatial light modulator. This may be done in any of a wide number of ways.

For example, consider the case where each pixel of the lower-resolution spatial light modulator corresponds to a plurality of pixels of the higher-resolution spatial light modulator. Image data specifying a desired image is supplied to the controller. The image data indicates a desired luminance for an image area corresponding to each of the pixels of the higher-resolution spatial light modulator. The controller may set the pixels of the lower-resolution light modulator to provide an approximation of the desired image. This could be accomplished, for example, by determining an average or weighted average of the desired luminance values for the image areas corresponding to each pixel of the lower-resolution light modulator.

The controller may then set the pixels of the higher-resolution light modulator to cause the resulting image to approach the desired image. This could be done, for example, by dividing the desired luminance values by the known intensity of light incident from the lower-resolution light modulator on the corresponding pixels of the higher-resolution light modulator. Processing to generate the signals for driving the light modulators may be performed on the fly by controller 39, may be performed earlier by controller 39 or some other device and integrated into the image data or some processing may be performed earlier and controller 39 may perform final processing to generate the control signals.

If the low-resolution pixels are too large then a viewer may be able to discern a halo around bright elements in an image. The low resolution pixels are preferably small enough that the appearance of bright patches on dark backgrounds or of dark spots on bright backgrounds is not unacceptably degraded. It is currently considered practical to provide in the range of about 8 to about 144, more preferably about 9 to 36, pixels on the higher-resolution light modulator for each pixel of the lower-resolution light modulator.

The sizes of steps in which each of pixels 42 and 44 can adjust the luminance of point(s) on the image are not necessarily equal. The pixels of the lower-resolution light modulator may adjust light intensity in coarser steps than the pixels of the higher-resolution light modulator. For example, the lower-resolution light modulator may permit adjustment of light intensity for each pixel over an intensity range of 1 to 512 units in 8 steps while the higher-resolution light modulator may permit adjustment of the light intensity for each pixel over a similar range in 512 steps. While pixels 42 and 44 are both illustrated as being square in FIG. 5, this is not necessary. Pixels 42 and/or 44 could be other shapes, such as rectangular, triangular, hexagonal, round, or oval.

Figure 7:
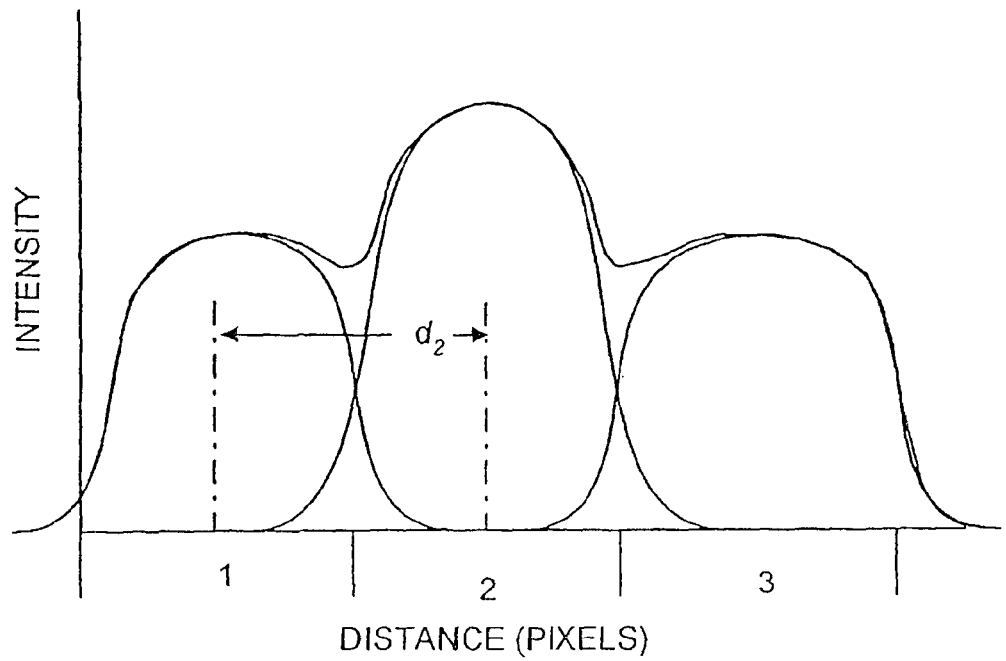
FIG. 7 is a graph illustrating how light imaged onto a higher-resolution light modulator from pixels of a lower-resolution light modulator can overlap to yield a smooth variation in light intensity with position; and, FIG. 7A is a graph illustrating how the variation in light intensity with position for the image of a pixel of a light modulator can be represented as the convolution of a square profile and a spread function.
Figure 7A:
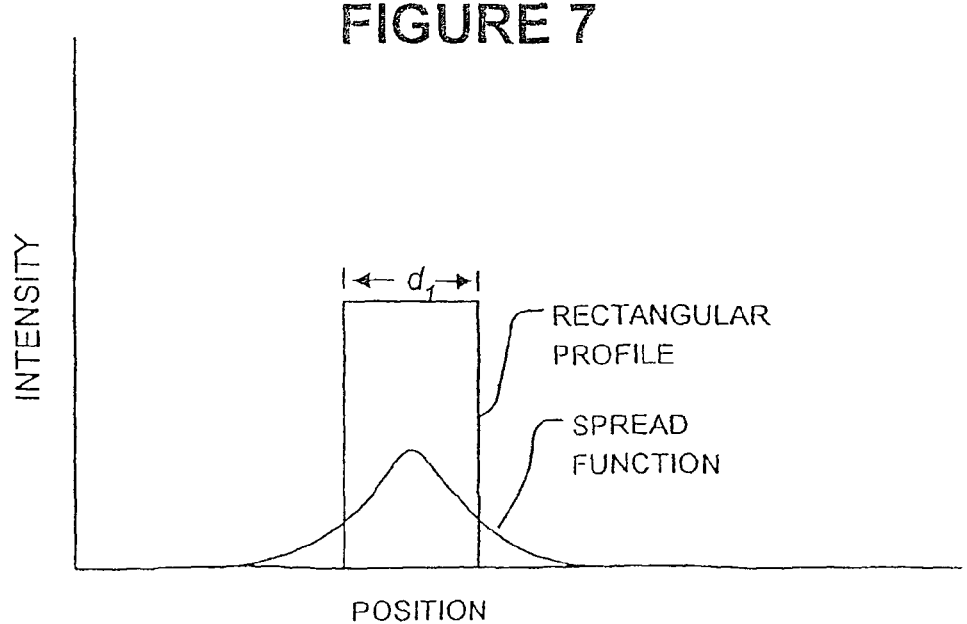

The pixels of the lower-resolution light modulator preferably emit light which is somewhat diffuse so that the light intensity varies reasonably smoothly as one traverses pixels of the lower-resolution light modulator. This is the case where the light from each of the pixels of the lower-resolution light modulator spreads into adjacent pixels, as shown in FIG. 7. As shown in FIG. 7A, the intensity profile of a pixel in the lower-resolution light modulator can often be approximated by gaussian spread function convolved with a rectangular profile having a width $d_1$ equal to the active width of the pixel. The spread function preferably has a full width at half maximum in the range of $0.3 \times d_2$ to $3 \times d_2$, where $d_2$ is the center-to-center inter-pixel spacing, to yield the desired smoothly varying light intensity. Typically $d_1$ is nearly equal to $d_2$.

In the embodiment of FIG. 5, each pixel 42 comprises three sub pixels 43R, 43G and 43B (for clarity FIG. 5 omits sub pixels for some pixels 42). Sub-pixels 43R, 43G and 43B are independently addressable. They are respectively associated with red, green and blue color filters which are integrated into second light modulator 20. Various constructions of LCD panels which include a number of colored sub-pixels and are suitable for use in this invention are known in the art.

For front projection-type displays (for example the display 10C of FIG. 4), it is typically most practical for first light modulator 16 to comprise a high-resolution light modulator which provides color information and for light modulator 36 to comprise a monochrome light modulator. Light modulator 36 preferably has reasonably small addressable elements so that the boundaries of its elements do not form a visually distracting pattern. For example, light modulator 36 may have the same number of addressable elements as projector 37 (although each such element will typically have significantly larger dimensions than the corresponding element in light modulator 16 of projector 37).

Projector 37 may have any suitable construction. All that is required is that projector 37 be able to project light which has been spatially modulated to provide an image onto screen 34. FIG. 6 illustrates a display system 10D according to a further alternative embodiment of the invention. System 10D comprises a screen 34 which has an integrated light modulator 36 as described above with reference to FIG. 4. System 10D comprises a projector 37A which has separate light modulators 16R, 16G and 16R for each of three colors. Light modulated by each of light modulators 16R, 16G and 16R is filtered by a corresponding one of three colored filters 47R, 47G and 47B. The modulated light is projected onto screen 34 by optical systems 17. A single light source 12 may supply light to all three light modulators 16R, 16G, and 16B, or separate light sources (not shown) may be provided.

As will be apparent to those skilled in the art in the light of the foregoing disclosure, many alterations and modifications are possible in the practice of this invention without departing from the spirit or scope thereof. For example:

- diffuser 22 and collimator 18 could be combined with one another;
- diffuser 22 and collimator 18 could be reversed in order;
- multiple cooperating elements could be provided to perform light diffusion and/or collimation;
- the order in screen 23 of second light modulator 20 collimator 18 and diffuser 22 could be varied;
- the signal 38A driving first light modulator 16 may comprise the same data driving second light modulator 20 or may comprise different data.

Accordingly, the scope of the invention is to be construed in accordance with the substance defined by the following claims.

What is claimed is:

1. A display comprising:
    a controller configured to receive image data and to control elements of a low-resolution light source and elements of a light-modulating panel having a spatial resolution higher than that of the light source, the image data specifying a desired image, the desired image having a desired luminance corresponding to each of the pixels of the light-modulating panel;
    the light source connected to receive from the controller first signals for separately controlling light output of a plurality of separately-controllable elements of the light source and configured such that light from the elements of the light source illuminates a face of the light modulating panel, wherein light from the elements of the light source spreads and mixes with light from adjacent ones of the elements of the light source such that output light varies smoothly;
    the light-modulating panel connected to receive from the controller second signals for controlling light transmissivity of pixels of the light-modulating panel;
    the controller configured to determine from the image data driving values for the separately-controllable elements of the light source and to provide the driving values in the first signals such that application of the first signals to control the separately-controllable elements of the light source results in illumination of the light modulating panel with light that provides an approximation of the desired image having a variation in light intensity with position on the light-modulating panel according to the image data, the controller further configured to set the second signals for controlling light transmissivity of the pixels of the light-modulating panel such that the resulting displayed image approaches the desired image specified by the image data.

2. A display according to claim 1 wherein the controller is configured to determine the light intensities of the approximation at the pixels of the light-modulating panel by estimating intensities of light emitted from the light source layer at the pixels of the light-modulating panel.

3. A display according to claim 2 wherein the controller is configured to determine the driving values for the separately-controllable elements of the light source layer by determining averages or weighted averages of the desired luminance values for image areas corresponding to each of the elements of the light source layer.

4. A display according to claim 1 wherein the controller is configured to set the pixels of the light-modulating panel based on elements of the light source having a spread function with a full width at half-maximum in the range of 0.3×d2 to 3×d2, where d2 is a center-to-center spacing of the separately-controllable elements of the light source.

5. A display according to claim 4 wherein the spread function has a full width at half-maximum approximately equal to d2.

6. A display according to claim 1 wherein the controller is configured to estimate an approximate intensity of light from the elements of the light source and to use the estimate to set the pixels of the light-modulating panel.

7. A display according to claim 1 wherein the light from the elements of the light source spreads substantially to the center of the adjacent pixels.

8. A display according to claim 1 wherein the display has a dynamic range of 800:1 or greater.

9. A display according to claim 1 wherein all elements of the light source have a variable light intensity controlled by the controller.

10. A display according to claim 1 wherein the light source is configured to emit white light.

11. A display according to claim 1 wherein the light-modulating panel comprises a color LCD panel wherein the pixels of the light-modulating panel comprise colur sub-pixels.

12. A display according to claim 1 wherein a maximum luminance of the display is at least $10^5$ cd/m$^2$.

13. A display according to claim 1 wherein the elements or the light source are rectangular.

14. A display according to claim 1 wherein the elements of the light source are configured to emit light which is somewhat diffuse.

15. A display according to claim 1 wherein an intensity profile of light from an element of the light source has a peak and falls off smoothly from the peak.

16. A display according to claim 15 wherein the intensity profile comprises a Gaussian spread function.

17. A display controller for controlling a display having a controllable light source and a light-modulating panel illuminated by the light source the light-modulating panel having a spatial resolution higher than that of the light source,
    the controller configured to receive image data specifying a desired image and to generate first signals for separately controlling light output of a plurality of separately-controllable elements of the light source and second signals for controlling light transmissivity of the pixels of the light-modulating panel, the desired image having a desired luminance corresponding to each of the pixels of the light-modulating panel;
    the controller configured to determine from the image data driving values for the separately-controllable elements of the light source such that application of the driving values to drive the separately-controllable elements of the light source results in light from the elements of the light source illuminating a face of the light modulating panel, wherein the light from the elements of the light source spreads and mixes with light from adjacent ones of the elements of the light source such that emitted light varies smoothly to provide an approximation of the desired image having a variation in light intensity with position on the light-modulating panel according to the image data;

the controller further configured to set the signals for controlling light transmissivity of the pixels of the light-modulating panel based on a known intensity of light from the light source on the pixels such that the resulting displayed image approaches the desired image specified by the image data.

18. A controller according to claim 17 wherein the controller is configured to determine the light intensities of the approximation at the pixels of the light-modulating panel by estimating intensities of light emitted from the light source layer at the pixels of the light-modulating panel.

19. A controller according to claim 18 wherein the controller is configured to determine the driving values for the separately-controllable elements of the light source layer by determining averages or weighted averages of the desired luminance values for image areas corresponding to each of the elements of the light source layer.

20. A controller according to claim 17 wherein the controller is configured to set the pixels of the light-modulating panel based on elements of the light source having a spread function with a full width at half-maximum in the range of 0.3×d2 to 3×d2, where d2 is a center-to-center spacing of the separately-controllable elements of the light source.

21. A controller according to claim 20 wherein the spread function has a full width at half-maximum approximately equal to d2.

22. A controller according to claim 17 wherein the controller is configured to estimate an approximate intensity of light from the elements of the light source and to use the estimate to set the pixels of the light-modulating panel.

* * * * *